US009083571B2

(12) United States Patent
Hoshyar et al.

(10) Patent No.: US 9,083,571 B2
(45) Date of Patent: Jul. 14, 2015

(54) SYMBOL-WISE CHANNEL TRACKING FOR SMART UTILITY NETWORKS (SUN) ORTHOGONAL FREQUENCY DIVISION MULTIPLEXING (OFDM)

(71) Applicant: TEXAS INSTRUMENTS INCORPORATED, Dallas, TX (US)

(72) Inventors: Reza Hoshyar, San Jose, CA (US); Anuj Batra, Dallas, TX (US); Timothy Mark Schmidl, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/145,471

(22) Filed: Dec. 31, 2013

(65) Prior Publication Data

US 2014/0307813 A1   Oct. 16, 2014

Related U.S. Application Data

(60) Provisional application No. 61/810,526, filed on Apr. 10, 2013.

(51) Int. Cl.
| | |
|---|---|
| *H04B 1/10* | (2006.01) |
| *H04L 25/02* | (2006.01) |
| *H04L 27/26* | (2006.01) |

(52) U.S. Cl.
CPC .......... *H04L 25/0202* (2013.01); *H04L 25/022* (2013.01); *H04L 25/023* (2013.01); *H04L 25/0204* (2013.01); *H04L 27/26* (2013.01)

(58) Field of Classification Search
CPC .......................... H04B 17/006; H04L 27/2647
USPC ........................................................ 375/350
See application file for complete search history.

(56) References Cited

U.S. PATENT DOCUMENTS

| | | | |
|---|---|---|---|
| 2005/0276347 A1* | 12/2005 | Mujtaba et al. | 375/299 |
| 2006/0159194 A1* | 7/2006 | Magee | 375/267 |
| 2007/0076811 A1* | 4/2007 | Aldana et al. | 375/267 |
| 2008/0101495 A1* | 5/2008 | Gaikwad | 375/267 |
| 2009/0080575 A1* | 3/2009 | Chuang et al. | 375/340 |
| 2014/0050254 A1* | 2/2014 | Azizi et al. | 375/219 |

\* cited by examiner

*Primary Examiner* — Juan A Torres
(74) *Attorney, Agent, or Firm* — John R. Pessetto; Charles A. Brill; Frank D. Cimino (57) ABSTRACT

A device for updating complex channel gain estimates for orthogonal frequency division multiplexed (OFDM) symbols that includes a receiver to receive a plurality of OFDM symbols, wherein each OFDM symbol includes a plurality of pilot tones at a subset of odd positions and a finite impulse response (FIR) filter. The FIR filter configured to filter a plurality of initial channel estimates of odd tones of an OFDM symbol using a first set of coefficients to generate an updated estimate of the channel estimates of the plurality of odd tones for that OFDM symbol, and filter the plurality of the initial channel estimates of the odd tones of the OFDM symbol using a second set of coefficients to generate estimates for a plurality of initial channel estimates of even tones for that OFDM symbol.

21 Claims, 4 Drawing Sheets

SYMBOL-WISE CHANNEL TRACKING FOR SMART UTILITY NETWORKS (SUN) ORTHOGONAL FREQUENCY DIVISION MULTIPLEXING (OFDM)

CROSS-REFERENCE TO RELATED APPLICATION

The present application claims priority to U.S. Provisional Patent Application No. 61/810,526, filed on Apr. 10, 2013; which is hereby incorporated herein by reference.

BACKGROUND

Smart Utility Networks (SUN) employing the IEEE 802.15.4g standard may use orthogonal frequency division multiplexing (OFDM) as a modulation technique. The OFDM modulation may result in the transmission of a packet of OFDM symbols. Each OFDM symbol comprised of a plurality of sub-carriers, also referred to as tones. The SUN systems may wirelessly transmit data from smart meters at an end point, e.g., a house or business, to a utility collection point. Alternatively, the transmissions may use the existing power line cables and propagate through the transformers on their way to the collection point. The collection point, a local router servicing many end points, transmits the collected data to the utility company for further processing. The collection point may transmit the data using any wired or wireless means. During the transmission of the OFDM symbols from the end points to the collection point, however, the channel condition may be affected by the introduction of time variations in the sub-carriers. The SUN system may need to adjust for these time variations to reliably track the channel conditions and decode the OFDM symbols.

SUMMARY

The problems noted above are solved in large part by a device for updating complex or real channel gain estimates for orthogonal frequency division multiplexed (OFDM) symbols that includes a receiver to receive a plurality of OFDM symbols, wherein each OFDM symbol includes a plurality of pilot tones at a subset of odd positions and a finite impulse response (FIR) filter. The FIR filter configured to filter a plurality of initial channel estimates of odd tones of an OFDM symbol using a first set of coefficients to generate an updated estimate of the channel estimates of the plurality of odd tones for that OFDM symbol, and filter the plurality of the initial channel estimates of the odd tones of the OFDM symbol using a second set of coefficients to generate estimates for a plurality of initial channel estimates of even tones for that OFDM symbol.

Another solution may be a low complexity channel tracking orthogonal frequency-division multiplexed (OFDM)-based device that includes a receiver to receive OFDM symbols and to update estimates of the complex channel gain of the tones of the OFDM symbols and to smooth the channel estimates of the OFDM symbols along a time-domain. The receiver including a finite impulse response (FIR) filter and a buffer. The FIR filter configured to filter a plurality of initial complex channel gain estimates of a plurality of odd tones of an OFDM symbol based on a first set of coefficients to generate an updated estimate of the complex channel gain for the plurality of odd tones of the OFDM symbol, and filter the plurality of initial complex channel gain estimates of the plurality of the odd tones of the OFDM symbol based on a second set of coefficients to generate an estimate of the complex channel gain for a plurality of even tones of the OFDM symbol.

And yet another solution may be a method to update the complex channel gain of each tone of an orthogonal frequency-division multiplexed (OFDM) symbol, the method includes buffering, by a receiver, a first OFDM symbol, wherein the first OFDM symbol comprises initial estimates of a complex channel gain for each odd tone of the OFDM symbol, receiving, by the receiver, a second OFDM symbol, wherein the second OFDM symbol includes a plurality of pilot tones at a subset of odd tone positions, replacing, by the receiver, all of the odd tones of the second OFDM symbol other than the plurality of pilot tones with the initial estimates of the complex channel gain from corresponding odd tones of the first OFDM symbol, filtering, by a finite impulse response (FIR) filter, the replaced odd tones and the plurality of pilot tones of the second OFDM symbol using a first set of FIR filter coefficients to generate updated complex channel gain estimates for the odd tones of the second OFDM symbol, and filtering, by the FIR filter, the replaced odd tones and the plurality of pilot tones of the second OFDM symbol using a second set of FIR filter coefficients to generate an estimate of the complex channel gain for even tones of the second OFDM symbol.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct electrical connection. Thus, if a first device couples to a second device, that connection may be through a direct electrical connection, or through an indirect electrical connection via other devices and connections. The principles disclosed herein may be implemented in a signal processor, an application specific integrated circuit (ASIC), or other type of device.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

A SUN system is a low rate (40 kbps to 1 Mbps), low power wireless technology that is specifically designed to be used in utility metering applications, such as transmitting electric, gas, or water usage data from the meter(s) on the customer premises to a data collection point operated for the utility. For example, meters could be installed for each house in a residential neighborhood, and then the data could be sent every 15 minutes from each meter to a pole-top data collection point. This data collection point could then be connected by fiber, copper wire, or wireless to a central office which collects all the data for a region. Data could either be sent directly from each meter to the collection point, or it could be hopped from meter to meter until it reaches the collection point.

As noted above, the SUN systems are moving to implement OFDM modulation in the transmission of utility usage data from a customer's smart meter to the data collection point. OFDM-based transmissions use OFDM symbols to transmit the usage data. The OFDM symbols conventionally comprise a plurality of sub-carriers or tones with the tones carrying the bits of data. The transmission of the OFDM packets from one point to another may occur in what is referred to as the channel. A channel condition may refer to the physical propagation environment conditions that may cause variations in the tones of the OFDM symbols. The variations may affect both the tone values in the frequency-domain and the time-domain, which may manifest as a complex channel gain multiplier value included in each tone of the OFDM symbols received.

The data transmitted over different sub-carriers may experience different channel gains. This is due to multi-path propagation of the transmitted signal caused by reflections off of various objects and other time delays introduced into the signal. Besides this frequency domain variation, the channel condition may change over time due to dynamics of the propagation environment. For a receiver to reliably decode the transmitted data, the OFDM modulation technique requires a reliable estimation of the complex channel gain associated with all the subcarriers of each of the OFDM symbols as well as reliable tracking of their change over time.

The OFDM symbols containing the usage data, also known as the payload or data-carrying OFDM symbols, may be combined into an OFDM packet, where the packet may include various other OFDM symbols. The various other OFDM symbols may be used to assist with channel tracking and extra sections to assist with symbol differentiation. For example, the start of the frame may include four short training field OFDM symbols followed by two long training field (LTF) OFDM symbols. The 2 LTF symbols may be averaged to generate 1 LTF symbol. The LTF symbols may provide initial complex channel gain estimations for each sub-carrier, also referred to as tones, of the LTF symbol. Additionally, the LTF symbols may be used by the receiver to estimate complex channel gain for the tones of the remaining OFDM symbols in the packet in conjunction with a periodic sequence of pilot tones embedded in the data-carrying OFDM symbols. The values of the tones of the LTF symbol and the pilot tones imbedded in the payload symbols may be of known values to the receiver. Since the receiver knows what these values should be, the difference between the known value and the received value allows the receiver to estimate the complex channel gain for those tones. The receiver may then use the complex channel gain estimates from the pilot tones and the LTF tones to estimate the complex channel gains for the remaining tones of the OFDM symbol. This further estimation may lead to reliable demodulation of the data.

The estimation of the complex channel gain for the tones of each OFDM symbol may allow for a receiver to track the channel conditions from OFDM symbol to OFDM symbol, i.e., symbol-wise tracking. The symbol-wise channel tracking may be implemented using various filtering techniques to obtain estimates of the complex channel gain for each tone of the OFDM symbols received by the smart meters. The symbol-wise channel tracking includes smoothing an OFDM symbol along the tones, i.e., along the frequency-domain. In addition to the smoothing along the tones, the OFDM symbols may also undergo an operation to smooth them along the time-domain in order to suppress the estimation error and exploit the time domain channel correlation.

The time-domain smoothing may require buffering the channel estimates of several OFDM symbols by applying an FIR or IIR (infinite impulse response) filter. To reduce buffering requirements as well as avoiding latency in data decoding due to this buffering, a first order IIR filtering is implemented that may only require storing the channel estimates of a previous OFDM symbol instead of a number of OFDM symbols that cover the complete period of pilot tones.

Figure 1:
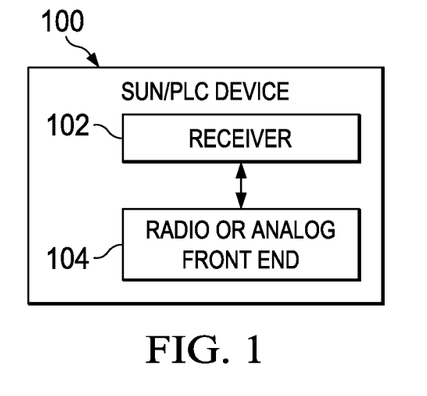
FIG. 1 shows a block diagram of a SUN device 100 for symbol-wise channel tracking with odd and even finite impulse response (FIR) filtering.

FIG. 1 shows a block diagram of a SUN device 100 for symbol-wise channel tracking with odd and even finite impulse response (FIR) filtering in accordance with various examples discussed herein. The device 100 may comprise a receiver 102 coupled to a radio or analog front end 104. The radio or analog front end 104 may initially receive the wirelessly transmitted OFDM symbols before relaying the OFDM symbols to the receiver 102 for processing, such as complex channel gain estimation, OFDM demodulation and data decoding. The device 100 may be a smart meter at an end user's location or it may be the data collection point. In either case, the device 100 may receive OFDM packets from other similar devices for routing to the data collection point.

For the receiver 102 to demodulate the OFDM symbols and decode the data, reliable estimations of the complex channel gain for each tone of the OFDM symbols may be necessary. The LTF symbol of an OFDM packet may be used as an initial estimation of the channel gain for each tone of the LTF symbol. The data-carrying OFDM symbols, which follow the LTF symbol in sequence, may comprise a number of sub-carriers or tones and the tones may be referred to as even or odd depending upon their location within the OFDM symbol. The position of the tones may be referenced to a central tone. A small subset of the odd tones of each data symbol may be pilot tones. For example, two odd positioned tones in each symbol may be pilot tones. The position of the pilot tones may change from symbol to symbol through a specific order in a specific period of symbols, and then the pattern repeats. For example, for option 3 of the IEEE 802.15.4g standard, the pilot tones may be in positions −7 and 7 in the first OFDM symbol at the start of the period, and then they may be in positions −11 and 3 in the second OFDM symbol, and so on, with the pattern repeating every 7 OFDM symbols.

Conventionally, a receiver may buffer all the symbols that comprise a full period of the pilot tones to estimate the channel gain for all the sub carriers of the corresponding OFDM symbols. For example, using the numbers above, that would require buffering at least 7 symbols of 27 sub-carriers each, including the DC tone. The receiver would then generate a matrix of the buffered tones, which would be 7×27, and a matrix operation would be performed to estimate the channel gain for all 189 (7×27) tones. The matrix operation may also be implemented using an FIR filter. That amount of buffering increases the complexity and cost of the receiver and the complicated calculation adds to the overhead of the overall system.

A solution to relieve the buffering and complexity of the calculation may be to estimate the channel gain for the sub-carriers of each OFM symbol as they are received/processed using the pilot tones of that symbol and borrowing the remaining odd tones from the previous OFDM symbol. The borrowed channel estimates may be referred to as "virtual pilot tones." For example, a first data symbol after the LTF symbol may include 2 pilot tones at positions −7 and 7, for example, which will be used as an initial estimate of the channel gain for those two tones and the remaining odd tones of the symbol may be borrowed from the previous symbol. The initial estimate of the odd tones of a symbol may be filtered through a finite impulse response (FIR) filter to give a smoothed updated estimate of the odd tones. The initial estimate of the odd tones may then be filtered a second time through a different FIR filter to produce a smoothed estimate of the even tones. Alternatively, a single FIR filter may be used to generate both the odd and even tone channel estimates by using different coefficients for the even and the odd tones. The combination of the smoothed odd and even tones may then provide an estimate of the channel gain for each tone of the OFDM symbol. The FIR coefficients used to produce the smoothed even and odd tones may be different. The FIR filtering of the tones may produce a channel estimate that is smoothed in the frequency-domain. The resulting symbol may undergo additional smoothing along the time-domain, as noted above.

The borrowing and filtering steps may be repeated for the remaining symbols in the packet. The second data symbol, however, may have the pilot tones at different positions, −11 and 3 for example, and the remaining odd tones are then taken from the initial complex channel gain estimates of the pre-FIR filtered first OFDM symbol. As such, the initial channel estimates for each tone of the second symbol may include the two pilot tones at positions −11 and 3, the pilot tones at positions −7 and 7 from the first OFDM symbol, and the rest of the odd tones may be borrowed from the estimates for the tones of the LTF symbol. A decreasing number of the channel estimates for the odd tones of the LTF symbol may be used in all the OFDM symbols covering the first period of the pilot tones. After the initial period of pilot tones have been received, however, the subsequent OFDM symbols may be borrowing those previously received pilot tones, which may not include any of the channel estimates from the LTF symbol. The odd tones may then be filtered by an FIR filter using one set of coefficients to produce updated complex channel gain estimates for the odd tones for the second OFDM symbol. The initial estimate of the odd tones may then be filtered by an FIR filter with a second set of coefficients to produce the smoothed even tones for the second OFDM symbol. The borrowing and filtering process may then continue for each subsequent OFDM symbol of the OFDM packet.

Disclosed herein are devices and methods for an efficient low complexity channel tracking technique. This technique, upon reception of the pilot tones, performs a symbol-wise operation and a special form of FIR filtering to produce improved updates of the tones' complex channel gain estimates. This technique also benefits from the special pattern of the pilot tones defined for option 3 of SUN-OFDM IEEE 802.15.4g standard. The pilot tones defined for this option are of a periodic pattern along the time and the overall pilot tones used in one period covers all the active odd tones. The tracking technique utilizes this property by treating the odd and even tones differently. Different FIR filters are used for estimation of the odd and even tones' complex channel gain estimates. The technique also pays special attention to close-to-edge tones and uses different FIR filters for these tones. Due to these special treatments, the algorithm is able to provide reliable estimation of all the tones' complex channel gain estimates with moderate complexity.

The symbol-wise tracking technique uses LTF-based complex channel gain estimates as the starting point and updates the complex channel gain estimates every OFDM symbol using the pilot tones received within that symbol and the previously received pilot tones and the LTF symbol's tones. The borrowed tones may be referred to as "virtual pilot tones." This tracking technique may be composed of three main stages—provision of initial estimates for odd tones of a corresponding OFDM symbol, different FIR filtering for odd tones and even tones, and smoothing the OFDM symbols along time-domain.

Figure 2:
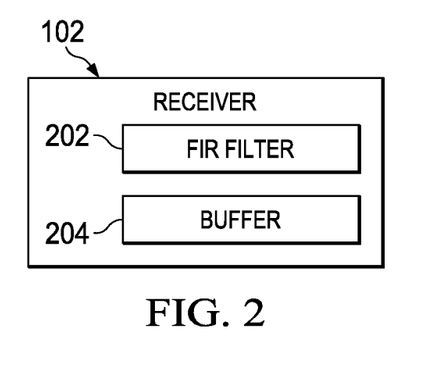
FIG. 2 shows a block diagram of the receiver 102 for symbol-wise channel tracking with odd and even finite impulse response (FIR) filtering.

FIG. 2 shows a block diagram of the receiver 102 for symbol-wise channel tracking with odd and even finite impulse response (FIR) filtering in accordance with various examples discussed herein. The receiver 102 may comprise an FIR filter 202 and a buffer 204. The receiver 102 along with the FIR filter 202 and the buffer 204 may perform the channel tracking technique to obtain initial complex channel gain estimates for tones of OFDM symbols using the LTF symbol and the pilot tones from current and previously received OFDM symbols. Further, the FIR filter 202 may generate updated complex channel gain estimates for odd tones using one set of FIR filter coefficients and may generate an initial complex channel gain estimates for even tones using a second set of FIR filter coefficients. The buffer 204 may store the pilot tones from previous OFDM symbols and the tones from the LTF symbol to use for estimating the complex channel gain for tones of a subsequent OFDM symbol. As used herein, the term "complex channel gain" may also be referred to as "channel gain."

The first part of the symbol-wise channel tracking technique, as noted above, is to obtain initial estimates of the channel gain for the odd tones of an OFDM symbol. For time varying channel conditions, the pilot tones received in previously received OFDM symbols along with select tones from the LTF symbol may be combined with the pilot tones of the current OFDM symbol to generate an initial estimate of the odd tones for the current OFDM symbol. Since each OFDM symbol received may only have two pilot tones, the current OFDM symbol may take the two pilot tones from the previous OFDM symbol, which may be in different odd tone locations than the pilot tones of the current OFDM symbol, and the remaining odd tones may be populated with tones from the LTF symbol and/or pilot tones from earlier received OFDM symbols. As such, the first OFDM symbol after the LTF symbol may have its two pilot tones at odd tone positions and the remaining odd tone positions may be populated from the corresponding odd tone positions of the LTF symbol. A second OFDM symbol may contain its two pilot tones and then borrow the two pilot tones from the first OFDM symbol and then populate the remaining odd tones with corresponding odd tones from the LTF symbol. This borrowing process may continue through the remaining OFDM symbols of the OFDM packet.

Figure 3:
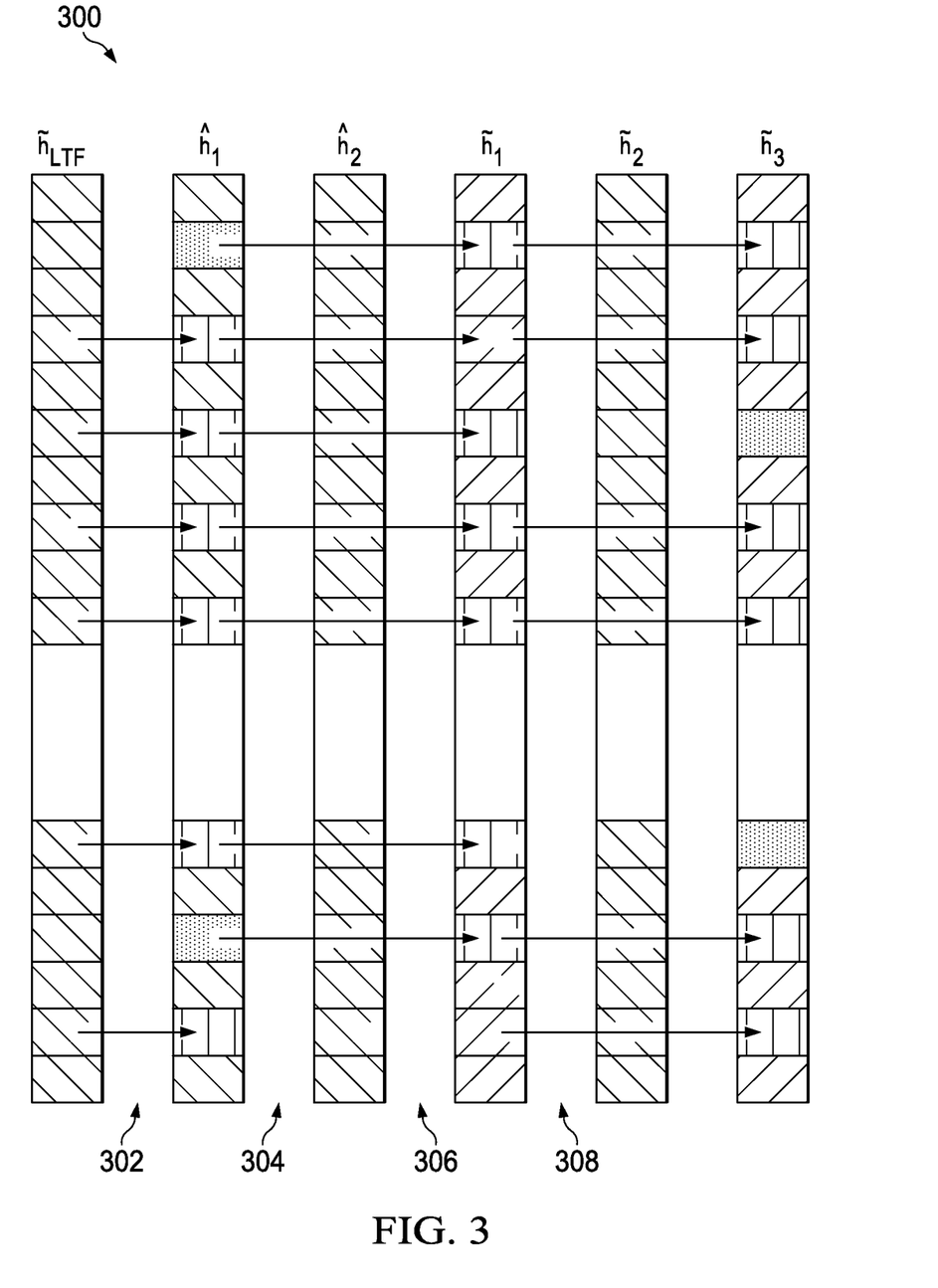
FIG. 3 shows an OFDM packet 300 and sharing initial complex channel gain estimates between the OFDM symbols.

FIG. 3 shows an OFDM packet 300 and sharing initial complex channel gain estimates between the OFDM symbols. The OFDM packet 300 shows one LTF symbol and pre and post FIR filtered data-carrying OFDM symbols. The vertical direction of FIG. 3 represents frequency and the horizontal direction represents time. The channel estimates of the LTF symbol is denoted with $\hat{h}_{LTF}$, the h's with the tilde, htilde, denote OFDM symbols pre FIR filtering, and the h's with the hat, $\hat{h}$, denote OFDM symbols post FIR filtering. Each small box of the symbols indicates a separate tone location and the filling in the box represents an initial complex channel gain of that tone location or a pilot tone. For example, the LTF symbol, $\hat{h}_{LTF}$, shows all tone locations with dark filling where the dark filling represents the initial estimates of the complex channel gain. For the OFDM symbol htilde1, the second tone location down and the fourth tone location from the bottom are pilot tones and the remaining odd tone locations are initial channel estimates taken from the LTF symbol as shown by arrows 302.

The channel estimates of the first OFDM symbol denoted by $\hat{h}_1$ with the tone locations filled in shows that all tone locations now have complex channel gain estimates as generated by the receiver 102. To generate the channel estimates for both the odd and even tones for the first OFDM symbol, the initial channel estimates of the odd tone locations from htilde1 are filtered through an FIR filter twice. Once with a first set of coefficients to generate the channel estimates for the odd tones of the first OFDM symbol and a second time with a second set of coefficients to generate the channel estimates for the even tones of the first OFDM symbol. Either before or after the FIR filtering of the initial channel estimates, the receiver 102 may store the channel estimates of the odd tone locations of htilde1 in the buffer 204 to be used by or combined with a subsequent OFDM symbol, such as htidle2, which is shown by arrows 304. This storing and sharing process continues on for the remainder of the OFDM symbols in the OFDM packet as shown by arrows 306 and 308.

As shown in FIG. 3, all of the initial channel estimates, i.e. htilde1, for the odd tones of the first OFDM symbol, other than the two pilot tones, are taken from the respective odd tone positions of the LTF symbol. The LTF symbol is one of the first symbols of an OFDM packet and channel estimates obtained from LTF may be stored in the buffer 204 before the receiver 102 processes any subsequent OFDM symbols. The channel estimates obtained from the LTF symbol, may be already filtered by a different FIR filter as it has initial estimates of all active tones and does not need odd/even treatment.

By combining previous pilot tones of OFDM symbols with the pilot tones of a current OFDM symbol, complex channel gain estimates may be calculated for the tones of the current OFDM symbol with little complexity and little storage space required. The buffer 204 may only need to store a single OFDM symbol and the filtering may require less complexity than conventional channel gain estimation method discussed above.

Figure 4:
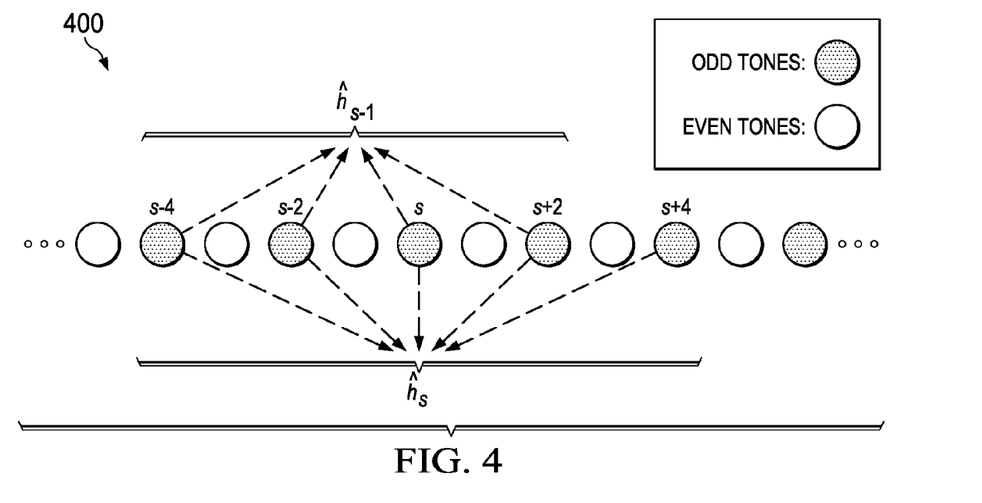
FIG. 4 shows two sliding windows 400 for producing the FIR filters for the odd and even tones.

Minimum mean square error (MMSE) principals may be used to be derive and calculated the FIR filters for producing the filtered, or smoothed, channel estimates for the even and odd tones. The FIR filters used to produce the even and the odd tones may be different in length and in the coefficients associated with calculating the channel estimates for the odd and even tones. To calculate the FIR filters corresponding to the even and odd tones, a sliding window is used to identify the active pilot tones and borrowed odd tones (the "virtual pilot tones") falling within the filter window. As the sliding window is run over the tones of an OFDM symbol, only the odd tones may be used as available pilots for producing the FIR filters for both the odd and even tones. FIG. 4 shows two sliding windows 400 for producing the FIR filters for the odd and even tones.

The two sliding windows 400 filter are used to generate updated and smoothed channel estimates for both the odd and even tones of an OFDM symbol from the odd pilot and virtual pilot tones of the OFDM symbol. The bottom window of FIG. 4 may be used to generate a smoothed channel estimate for an odd tone, denoted by $\hat{h}_s$. The top window in FIG. 4 may be used to generate a smoothed channel estimate for an even tone and is denoted by $\hat{h}_{s-1}$. Due to the finite length of the OFDM symbols, i.e., the number of tones, the middle tones may be filtered differently than edge and close-to-edge tones due to the filtering window falling outside of the OFDM symbol at and near the edges. As shown, to generate a channel estimate of the odd tone $\hat{h}_s$, the active tones s−4, s−2, s, s+2 and s+4 may fall within the filtering window. To generate the channel estimate for the even tone $\hat{h}_{s-1}$, the active tones s−4, s−2, s and s+2 may fall within the filtering window.

For the middle tone, where all the odd tones falling within a filtering window are active pilot tones and virtual pilot tones, the derived MMSE coefficients will be tone invariant and are denoted by $\eta_{0,odd}$ and $\eta_{0,even}$ for odd and even tones, respectively. When the sliding window reaches the edge tones, not all of the tones falling within the window may be active pilot tones or virtual pilot tones. These differences at the edge of an OFDM symbol may lead to different MMSE coefficients, and different FIR filter coefficients are used to filter these tones while also treating the odd/even tones separately.

The FIR coefficients for the close-to-edge tones may be tone dependent and are denoted $\eta_{s,odd}$ and $\eta_{s,even}$ for odd and even tones, respectively. The subscript s indicates the tone index. The resulting FIR filters to provide channel estimates for odd and even tone locations are then: For an odd tone FIR filter:

$$\eta_{odd} = \begin{cases} \eta_{s,odd} & \tilde{s} = \tilde{M}-1, -\tilde{M}, \ldots, -\tilde{M}+\tilde{m}-2 \\ \eta_{o,odd} & \tilde{s} = -\tilde{M}+\tilde{m}-1, \ldots, \tilde{M}-\tilde{m} \\ \eta_{s,odd} & \tilde{s} = \tilde{M}-\tilde{m}+1, \ldots, \tilde{M} \end{cases} \text{with } s = 2\tilde{s}+1$$

For an even tone FIR filter:

$$\eta_{even} = \begin{cases} \eta_{s,even} & \tilde{s} = -\tilde{M}, \ldots, -\tilde{M}+\tilde{m}-2 \\ \eta_{o,even} & \tilde{s} = -\tilde{M}+\tilde{m}-1, \ldots, \tilde{M}-\tilde{m}+1 \\ \eta_{s,even} & \tilde{s} = \tilde{M}-\tilde{m}+2, \ldots, \tilde{M}, \end{cases} \text{with } s = 2\tilde{s}$$

In above relations $M=2\tilde{M}+1$ and $\tilde{s}$ is used to index the odd tones with $s=2\tilde{s}+1$, for $\tilde{s}=-\tilde{M}-1, \ldots, \tilde{M}$ and even tones with $s=2\tilde{s}$ for $\tilde{s}=-\tilde{M}, \ldots, \tilde{M}$. From the above relations, the odd filtering is doing edge treatment for first and last $\tilde{m}$ clock cycles, and the main middle tones filtering $2\tilde{M}-2\tilde{m}+2$ clock cycles are used. For even filtering one less clock cycle is used for edge filtering, e.g., first and last $\tilde{m}-1$ clock cycles for edge treatment, and $2\tilde{M}-2\hat{m}+3$ clock cycles for the main filtering. The two odd/even FIR filters may be combined to share a shift register.

Figure 5:
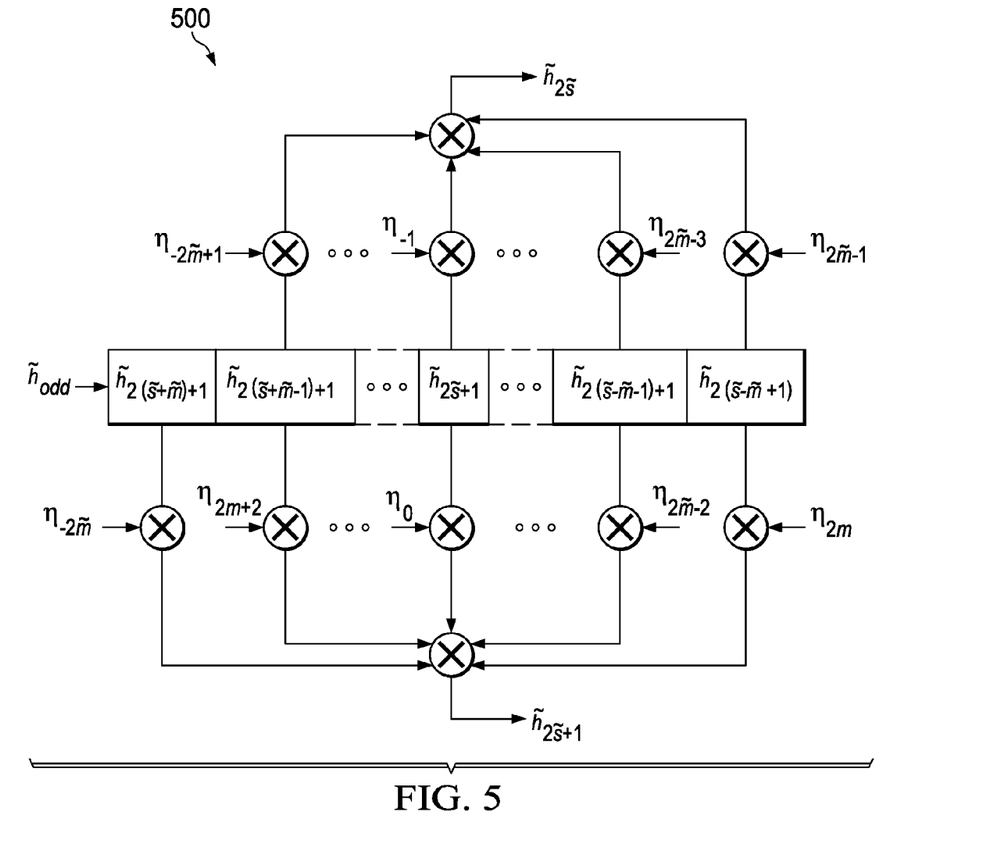
FIG. 5 is an example shift register 500 for implementing the odd and even FIR filtering for the symbol-wise channel tracking.

FIG. 5 is an example shift register 500 for implementing the odd and even FIR filtering for the symbol-wise channel tracking as discussed herein. The shift register may receive, e.g., clock in, the odd pilot tones and virtual pilot tones of an OFDM symbol on the left side, denoted by $\tilde{h}tilde_{odd}$. As the pilot tones and virtual pilot tones are clocked into the shift register 500, the estimates for the channel gain for the even and odd tones of the OFDM symbol may be generated. The edge tones may be filtered differently than middle tones due to fewer pilot tones and virtual pilot tones being in the shift register 500 at the beginning and the end of an OFDM symbol.

The shift register length may be $2\hat{m}+1$ where the odd filtering will use all of its contents, while the even filtering will use one memory cell less. In FIG. 5, the coefficients $\eta=(\eta_{-2\hat{m}}, \eta_{+2\hat{m}-1}, \ldots, \eta_0, \ldots, \eta_{2\hat{m}-1}, \eta_{2\hat{m}})$ is composed of both odd and even filters coefficients, its odd indices $(\eta_{-2\hat{m}+1}, \ldots, \eta_{-1}, \eta_1 \ldots, \eta_{2\hat{m}-1})$ are the coefficients of $\eta_{even}$ and the even indices $(\eta_{-2\hat{m}+1}, \ldots, \eta_{-1}, \eta_0, \eta_2, \ldots, \eta_{2\hat{m}})$ are the coefficients of $\eta_{odd}$. The shift register 500 may be initialized to $(\tilde{h}_{-2\tilde{M}+2\hat{m}-1}, \ldots, \tilde{h}_{-2\tilde{M}+1}, \tilde{h}_{-2\tilde{M}-1}, 0_{1\times\hat{m}})$. The first clock cycle the initialized content may be used to calculate both add and even outputs. The shift register 500 may be fed with lower indices first. Therefore, during the second clock cycle the content of the register may be shifted to right and the input $\tilde{h}_{-2\tilde{M}+2\hat{m}+1}$ may be loaded into the first (leftmost) cell. After feeding the last odd tone estimate $\tilde{h}_{-2\tilde{M}+1}$ the rest of the clock cycles the shift register may be fed with zeros. At the first clock cycle, the output of even filter may be $\tilde{h}_{-2\tilde{M}}$, which may not be needed and may be discarded. Alternatively, the multiplication and addition operations of the even filter for the first clock cycle may be disabled.

For this new filter structure to use the same clock cycle pattern described for two separate odd/even filtering, the first clock cycle may not be counted for the even filtering. In other words the even filter may have one inactive clock cycle, $\hat{m}-1$ left edge clock cycles, $2\tilde{M}-2\hat{m}+3$ clock cycles for the mid tones, and finally $\hat{m}-1$ right edge clock cycles. This may lead to a total of $2\tilde{M}+2$ clock cycles which is also the same value for the odd filter.

Figure 6:
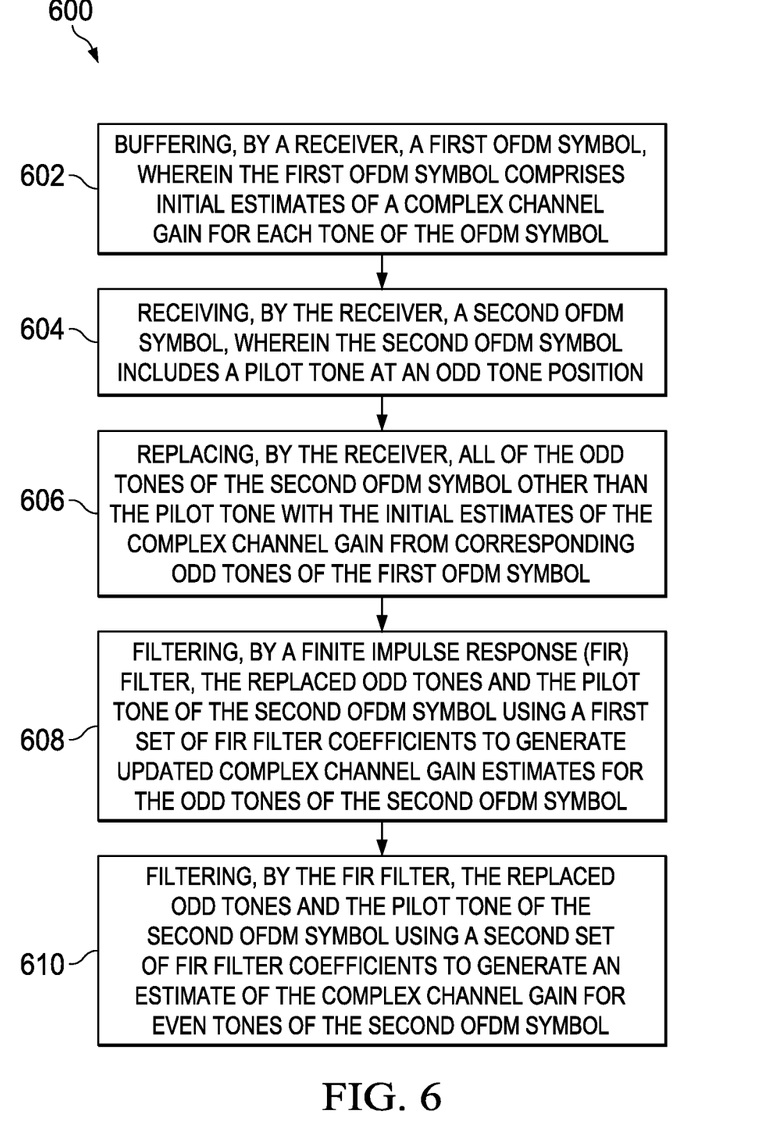
FIG. 6 is an example flow chart for a method 600 for implementing the symbol-wise channel tracking with odd and even finite impulse response (FIR) filtering.

FIG. 6 is an example flow chart for a method 600 for implementing the symbol-wise channel tracking with odd and even finite impulse response (FIR) filtering in accordance with various examples discussed herein. The method 600 begins at step 602 with buffering, by the buffer 204, channel estimates of tones or pilot tones of a first OFDM symbol. This estimate may comprise initial estimates of the complex channel gain for each tone of the OFDM symbol. This step may represent buffering the odd tones' channel estimates obtained from the LTF symbol but may also represent buffering the estimates of the odd tones of a previous OFDM symbol, which may include that OFDM symbol's pilot tones, a previous OFDM symbol's pilot tones, and a number of odd tones from the LTF symbol. The buffering may be performed so that a subsequent OFDM symbol may borrow channel estimates for odd tones that are not pilot tones.

The method 600 may then continue at step 604 with receiving, by the receiver 102, a second OFDM symbol. The second OFDM symbol may include a plurality of pilot tones at a subset of odd tone positions. Step 606 continues the method 600 with replacing all of the odd tones of the second OFDM symbol other than the plurality of pilot tones with the initial estimates of the complex channel gain from corresponding odd tones of the first OFDM symbol. The receiver 102 may perform the replacement step.

The method 600 then continues at step 608 with filtering, by the FIR filter 202, the replaced odd tones and the plurality of pilot tones of the second OFDM symbol using a first set of FIR filter coefficients to generate updated complex channel gain estimates for the odd tones of the second OFDM symbol. The method 600 then ends at step 610 with filtering, by the FIR filter 202, the replaced odd tones and the plurality of pilot tones of the second OFDM symbol using a second set of FIR filter coefficients to generate an estimate of the complex channel gain for even tones of the second OFDM symbol. The receiver 102 via the FIR filter 202 may generate an estimate of the complex channel gain for both the odd and even tones of an OFDM symbol using the initial estimates for odd tones, where the initial odd tone estimates are the plurality of pilot tones for that OFDM symbol and the borrowed virtual tones from a previous OFDM symbol. By performing the channel estimation and tracking on OFDM symbol by symbol basis, the amount of buffering and the complexity of the calculation may be reduced. This symbol-wise channel tracking may reduce an implementing system's overhead and latency.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A device for updating channel gain estimates for orthogonal frequency division multiplexed (OFDM) symbols, comprising:
a receiver to receive a plurality of OFDM symbols, wherein each OFDM symbol includes a plurality of pilot tones at a subset of odd positions; and
a finite impulse response (FIR) filter configured to:
filter a plurality of channel estimates of odd tones of an OFDM symbol using a first set of coefficients to generate an updated estimate of the channel estimates of the plurality of odd tones for that OFDM symbol, and
filter the plurality of the channel estimates of the odd tones of the OFDM symbol using a second set of coefficients to generate estimates for a plurality of initial channel estimates of even tones for that OFDM symbol.

2. The device of claim 1, wherein the device further comprises a buffer to store the channel estimates of a previous OFDM symbol of the plurality of OFDM symbols.

3. The device of claim 1, wherein the odd tones of each OFDM symbol comprise that symbol's plurality of pilot tones and all other odd tones of the OFDM symbol are taken from a previous OFDM symbol.

4. The device of claim 1, wherein a first OFDM symbol of the plurality of symbols is a preamble symbol containing the channel estimates for all tones of the first OFDM symbol.

5. The device of claim 1, wherein a FIR filtering window is longer for filtering the odd tones than for filtering the even tones.

6. The device of claim 1, wherein the FIR filter filters edge and close-to-edge tones of the OFDM symbols differently than middle tones of the OFDM symbol.

7. The device of claim 1, wherein the FIR filter is implemented with a shift register.

8. The device of claim 7, wherein the shift register receives the odd tones as inputs and the positions of the shift register are multiplied by different coefficients to generate the updated odd tones and the even tones of the OFDM symbols.

9. A low complexity channel tracking orthogonal frequency-division multiplexed (OFDM)-based device, comprising:
  a receiver to receive OFDM symbols and to update estimates of the channel gain of the tones of the OFDM symbols and to smooth the channel estimates of the OFDM symbols along a time-domain;
  the receiver comprising a finite impulse response (FIR) filter and a buffer, the FIR filter configured to:
    filter a plurality of initial channel gain estimates of a plurality of odd tones of an OFDM symbol based on a first set of coefficients to generate an updated estimate of the channel gain for the plurality of odd tones of the OFDM symbol; and
    filter the plurality of gain estimates of the plurality of the odd tones of the OFDM symbol based on a second set of coefficients to generate an estimate of the channel gain for a plurality of even tones of the OFDM symbol.

10. The device of claim 9, wherein the buffer is configured to store the channel gain estimates of a previous OFDM symbol.

11. The device of claim 9, wherein middle tones of the OFDM symbol are filtered differently than edge tones of the OFDM symbol.

12. The device of claim 9, wherein the FIR filter is a shift register.

13. The device of claim 10, wherein the channel gain of the plurality of the odd tones of the OFDM symbol other than the pilot tone are taken from the previous OFDM symbol's odd tones.

14. The device of claim 11, wherein the edge tones and middle tones are filtered differently due to a length of the filtering window.

15. The device of claim 12, wherein inputs to the shift register are the channel gain estimates of the odd tones of the OFDM symbol and positions of the shift register are multiplied by the first set of coefficients to generate the updated channel gain estimates of the odd tones and the second set of coefficients to generate the estimate of the channel gain for the even tones.

16. The device of claim 13, wherein the odd tones of a first OFDM symbol other than the pilot tone are taken from a long training field (LTF) symbol.

17. A method to update the channel gain of each tone of an orthogonal frequency-division multiplexed (OFDM) symbol, comprising:
  buffering, by a receiver, a first OFDM symbol, wherein the first OFDM symbol comprises estimates of a channel gain for each odd tone of the OFDM symbol;
  receiving, by the receiver, a second OFDM symbol, wherein the second OFDM symbol includes a plurality of pilot tones at a subset of odd tone positions;
  replacing, by the receiver, all of the odd tones of the second OFDM symbol other than the plurality of pilot tones with the initial estimates of the channel gain from corresponding odd tones of the first OFDM symbol;
  filtering, by a finite impulse response (FIR) filter, the replaced odd tones and the plurality of pilot tones of the second OFDM symbol using a first set of FIR filter coefficients to generate updated channel gain estimates for the odd tones of the second OFDM symbol; and
  filtering, by the FIR filter, the replaced odd tones and the plurality of pilot tones of the second OFDM symbol using a second set of FIR filter coefficients to generate an estimate of the channel gain for even tones of the second OFDM symbol.

18. The method of claim 17, wherein the first OFDM symbol is a long training format symbol.

19. The method of claim 17, wherein a length of the FIR filter is different for generating the updated channel gain estimates for the odd tones than for generating the estimate of the channel gain for even tones of the second OFDM symbol.

20. The method of claim 17, wherein middle tones of the second OFDM symbol are filtered differently than edge tones of the second OFDM symbol.

21. The method of claim 17, further comprising, replacing the first OFDM symbol with the replaced odd tones and the plurality of pilot tones of the second OFDM symbol.

* * * * *